UNITED STATES PATENT OFFICE.

FRANCIS WOODARD, OF SUGAR GROVE, PENNSYLVANIA.

COMPOSITION USED IN SOLDERING.

SPECIFICATION forming part of Letters Patent No. 584,446, dated June 15, 1897.

Application filed January 5, 1897. Serial No. 618,019. (No specimens.)

*To all whom it may concern:*

Be it known that I, FRANCIS WOODARD, a citizen of the United States, residing at Sugar Grove, in the county of Warren and State of Pennsylvania, have invented a certain new and useful Composition to be Used in Soldering; and I do hereby declare the following to be a full, clear, and exact description of the invention, such as will enable others skilled in the art to which it appertains to make and use the same.

This composition consists of the following ingredients, combined with the proportions specified, namely: eighty (80) parts of lead, eighty (80) parts of tin, and one and one-half (1½) parts of mercury. These ingredients are of course combined while in a liquid condition, thoroughly intermingled, and allowed to harden.

This composition forms a soldering compound which can be used with the heat obtained from a match or candle and does not necessitate the use of acids, zinc, or rosin or a soldering-iron. It solders all kinds of metals—such as gold, silver, tin, copper, &c.

A convenient way to apply the solder is—for instance, when mending a hole in a dish or pan—to apply a match or candle beneath the hole and hold the end of the solder-stick on the upper side, and as soon as the solder commences to melt to draw it across the hole and remove the heat to allow the solder to harden and thus mend the hole. In this way it will be seen that the solder can be used in a convenient manner and will effectually mend openings in the manner specified or will solder the various metals referred to.

Having thus described my invention, what I claim as new, and desire to secure by Letters Patent, is—

The herein-described composition of matter to be used as a solder which consists of eighty parts of lead, eighty parts of tin and one and one-half parts of mercury combined as specified.

In testimony whereof I have signed this specification in the presence of two subscribing witnesses.

FRANCIS WOODARD.

Witnesses:
 E. G. WOODARD,
 MARY WOODARD.